US005804708A

United States Patent [19]
Yamanaka et al.

[11] Patent Number: 5,804,708
[45] Date of Patent: Sep. 8, 1998

[54] ATOMIC FORCE MICROSCOPE AND METHOD OF ANALYZING FRICTIONS IN ATOMIC FORCE MICROSCOPE

[75] Inventors: Kazushi Yamanaka, Tsukuba; Eisuke Tomita, Chiba, both of Japan

[73] Assignee: Agency Industrial Science and Seiko Instruments Inc., Japan

[21] Appl. No.: 528,956

[22] Filed: Sep. 15, 1995

[30] Foreign Application Priority Data

Nov. 15, 1994 [JP] Japan ..................................... 6-305564

[51] Int. Cl.$^6$ ...................................... G01B 5/28
[52] U.S. Cl. ............................................ 73/105
[58] Field of Search ............................. 73/105; 250/306, 250/307

[56] References Cited

U.S. PATENT DOCUMENTS 5,503,010   4/1996   Yamanaka .................................. 73/105

OTHER PUBLICATIONS

Hipp et al., "A Stand–Alone Scanning Force and Friction Microscope", Ultramicroscopy, 42–44, (1992), pp. 1498–1503.

Mate et al., "Atomic–Scale Friction of a Tungsten Tip on a Graphite Surface", Physical Review Letters, vol. 59, No. 17, 26 Oct. 1987, pp. 1942–1945.

Meyer et al., "Simultaneous Measurement of Lateral and Normal Forces with an Optical–Beam–Deflection Atomic Force Microscope", Appl. Phys. Lett., vol. 57, No. 20, 12 Nov. 1990, pp. 2089–2091.

Radmacher et al., "from Molecules to Cells: Imaging Soft Samples with the Atomic Force Microscope", Science, vol. 257, 25 Sep. 1992, pp. 1900–1905.

O'Shea et al., "Atomic Force Microscope Study of Boundary Layer Lubrication", Appl. Phys. Lett., vol. 61, No. 18, 02 Nov. 1992, pp. 2240–2242.

Burnham et al., "Force Microscopy", to be Published in Scanning Tunneling Microscopy: Theory and Appliction, p. 12.

*Primary Examiner*—Hezron E. Williams
*Assistant Examiner*—Daniel S. Larkin
*Attorney, Agent, or Firm*—Adams & Wilks

[57] ABSTRACT

An atomic force microscope comprises a vibrating device for producing transverse vibrations between a sample and a probe and a vertical load-adjusting device for adjusting the vertical load between the sample and the probe. The sample is vibrated transversely, thus inducing a deflecting vibration on a cantilever. The phase and the amplitude of this deflecting vibration are simultaneously measured. The dependence of the measured value on the vertical load between the sample and the probe is measured. Thus, the friction between the sample and the probe is analyzed.

12 Claims, 6 Drawing Sheets

SLIPPAGE

SHEARING DEFORMATION
(VISCOELASTICITY)

LOADING    UNLOADING

ATOMIC FORCE MICROSCOPE AND METHOD OF ANALYZING FRICTIONS IN ATOMIC FORCE MICROSCOPE

BACKGROUND OF THE INVENTION

The present invention relates to techniques for measuring and imaging friction coefficients by inducing transverse vibrations between a sample and the cantilever of an atomic force microscope. These techniques can be utilized for observation of materials, management of cleanliness, evaluation of microminiature devices, and analysis of troubles in accurate instruments.

An atomic force microscope (AFM) [Binnig, Quate and Gerber, Phys. Rev. Lett. Vol. 56, No. 9, 03 Mar. 1986, pp. 930–933] scans a sample by means of a sharp probe and a soft cantilever holding the probe to observe atoms and molecules, without using a vacuum. In this way, the atomic force microscope is an epoch-making microscope. Atomic force microscopes have found intensive application in high technologies such as mechanical techniques, electronics, and biotechnology. A friction force microscope (FFM) [Mate, McClelland, Erlandsson and Chiang, Phys. Rev. Lett., Vol. 58, No. 17, 26 Oct. 1987, pp. 1942–1945] which has been developed based on the atomic force microscope is an atomic force microscope for measuring the lateral deflection of a cantilever due to the frictional force between a sample surface and a probe to image the distribution of the frictional force.

However, the mechanism by which a frictional force is produced is quite complex. The causes of frictional forces are varied by the materials of the sample and probe, the hardness of the cantilever, and the measuring environment. Therefore, in order to make effective use of measurements of frictional forces, it is necessary to investigate the causes of frictional forces. Especially, it is effective to vary the vertical load between the sample and the probe. However, when an ordinary FFM is used, it is difficult to measure the dependence of the frictional force on the amount of proximity of the probe to the sample at the same location on the sample. Accordingly, O'Shea and others have proposed a method of measuring the dependence on the amount of proximity of the probe to the sample [S. J. O'Shea and E. Welland, Appla. Phys. Lett., Vol. 61, No. 18, 02 Nov. 1992, pp. 2240–2242]. In this method, transverse vibrations are applied to the sample. The magnitude of the frictional force is determined from the amplitude of the torsional vibration of the cantilever. In this way, the dependence is measured. Also, they evaluated the lubricating effect of molecules adsorbed on the surface. However, in order to measure the dependence on the vertical load between the sample and the probe by imparting transverse vibrations to the sample, it is considered that phase information is important, as well as the amplitude of the torsional vibration. In spite of this, the phase of the frictional force was not measured in this research. Furthermore, in the FFM, the torsion of the cantilever is induced also by unevenness of the sample. Therefore, it is difficult to separate the sample unevenness from the frictional force. In an attempt to solve this problem, the present inventors and others have proposed a method of producing an image in which the frictional force is separated from the unevenness better than in the prior art frictional force microscopy, by making use of transverse vibrations of the sample ["K. Yamanaka, O. Kolosov, H. Ogiso, H. Sato and T. Koda, Atomic Force Microscope and Method of Observing Sample in Atomic Force Microscope", Japanese Patent Application No. 135342/1993, Patent No. 2535759 (1996)].

In this invention, the phase of a frictional force was measured but the phase information was used to discriminate between unevenness and friction. However phase information was not employed to investigate the causes of the frictional force in detail.

In view of the foregoing circumstances, the present invention has been made, wherein frictional forces in frictions under various conditions are measured systematically to thereby investigate the causes of the frictional forces. For this purpose, transverse vibrations are applied to a sample, thus inducing torsional vibrations of a cantilever. Phase information is utilized, as well as the amplitude of the torsional vibrations. More particularly, the invention is intended to provide a method of analyzing frictions by estimating the causes of frictional forces such as slippage and shearing deformation from variations in phase of the torsional vibration caused by varying the vertical load between the sample and the probe. Also, an atomic force microscope used for this method is proposed.

SUMMARY OF THE INVENTION

In conformity with this object, an atomic force microscope according to the present invention is characterized in that it is equipped with a vibrating device for producing transverse vibrations between a sample and a probe and also with a vertical load-adjusting device for adjusting the vertical load between the sample and the probe. A method of analyzing frictions in an atomic force microscope according to the present invention comprises the steps of: vibrating a sample transversely; measuring the phase of torsional vibrations of a cantilever excited by transverse vibrations of the sample; simultaneously measuring the amplitude of the torsional vibrations; measuring dependence of the measured values on vertical load between the sample and the probe, thus analyzing the friction between the sample and the probe.

When the sample is vibrated transversely, the cantilever vibrates about its balanced position. At this time, the vertical load between the sample and the probe is adjusted by adjusting the amount of proximity of the probe to the sample or by other means. The phase and amplitude of the torsional vibration of the cantilever are measured simultaneously. The dependence of the recorded values on the vertical load between the sample and the probe are recorded and displayed.

DETAILED DESCRIPTION OF THE INVENTION

Figure 1:
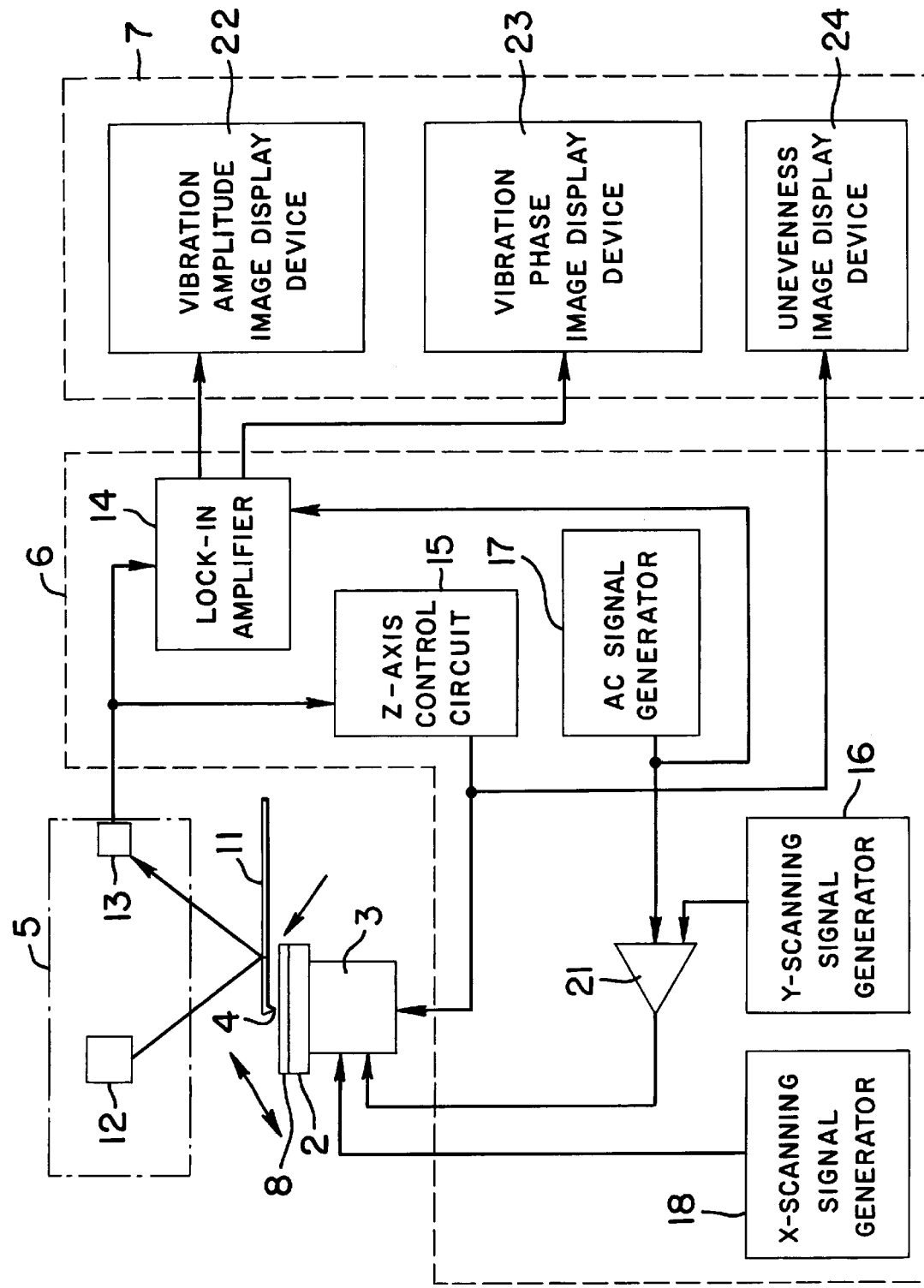
FIG. 1 is a diagram showing the structure of an atomic force microscope.

The present invention is hereinafter described in detail by referring to the drawings which show one example. FIG. 1 shows an atomic force microscope. The atomic force microscope comprises a sample stage 2, a sample stage driver 3 for driving the sample stage 2, a probe 4, a cantilever-measuring device 5, a control unit 6, and a display unit 7. A sample 8 can be attached to the surface of the sample stage 2. The sample stage 2 is driven by the sample stage driver 3. The probe 4 is placed in proximity to the sample 8 on the sample stage 2 and held to the front end of a cantilever 11. The cantilever-measuring device 5 consists of a laser 12 and a photodetector 13. The laser 12 emits a laser beam to the cantilever 11. The photodetector 13 detects light reflected by the cantilever 11 and measures the position and posture of the cantilever 11. A position-sensitive photodetector (PSD) divided vertically and horizontally into four parts can be used as the photodetector 13.

The control unit 6 comprises a lock-in amplifier 14, a z-axis control circuit 15, a y-scanning signal generator 16, an ac signal generator 17, an x-scanning signal generator 18, and an adder 21. In this example, the direction of the long axis of the cantilever 11 is taken to be on the x-axis. The direction of the short axis is taken to be on the y-axis. The direction of the normal to the sample 8 is taken to be on the z-axis. The z-axis control circuit 15 acts as a vertical load adjusting device for adjusting a vertical load between the sample 8 and the probe 4 and a proximity amount-adjusting device for adjusting the amount of proximity of the probe to the sample. This amount of proximity represents the vertical load between the sample and the probe. The display unit 7 comprises a vibration amplitude image display device 22, a vibration phase image display device 23, and an unevenness image display device 24. In operation, the z-axis control circuit 15 receives the signal from the photodetector 13 and produces a control signal to the sample stage driver 3 according to the position and posture of the cantilever 11. Thus, the position of the sample stage 2 in the z-axis direction (vertical direction) is controlled, so that the amount of proximity of the probe to the sample is adjusted. The x-scanning signal generator 18 and the y-scanning signal generator 16 produce signals for manipulating the sample stage driver 3 in the x-direction and the y-direction, respectively. These signals are applied to the sample stage driver 3. An ac signal generated by the ac signal generator 17 is added to the signal from the y-scanning signal generator 16 in the adder 21 and then applied to the sample stage driver 3. The lock-in amplifier 14 receives the ac signal generated by the ac signal generator 17 as a reference signal, and amplifies the output from the photodetector 13. Signals indicating the amplitude and the phase of the ac component are delivered. The vibration amplitude image display device 22 of the display unit 7 receives the amplitude signal from the lock-in amplifier 14 and displays an image of the amplitude of the vibration of the cantilever 11. The unevenness image display device 24 visualizes the unevenness of the surface of the sample 8 according to the output from the z-axis control circuit 15. The vibration phase image display device 23 displays images as functions of the phase and the vertical load or the amount of proximity of the probe to the sample.

In this example, the direction of the long axis of the cantilever is taken to be on the x-axis. The direction of the short axis is taken to be on the y-axis. The direction of the normal to the sample is taken to be on the z-axis. A circuit 21 is provided which is capable of externally adding an alternating current to the y-axis driving signal for the sample stage. An ac signal generated by a synthesizer is added. The sample is vibrated transversely. As a result of the vibrations, bending vibrations and torsional vibrations are induced on the cantilever. These vibrations are detected by the position-sensitive photodetector (PSD) and divided vertically and horizontally into four parts. The amplitude and the phase of the torsional vibration are measured, using the lock-in amplifier. At this time, a triangular wave signal is applied to the piezoelectric device of the z-axis control circuit 15 which controls the z position of the sample stage, and the sample stage is moved up and down. The amplitude and phase of the torsional vibration of the cantilever are recorded while plotting the amount of variation of the z position on the horizontal axis.

Figure 2A:
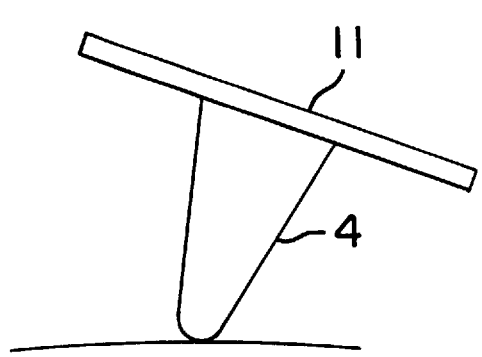
FIGS. 2A and 2B are enlarged views showing the manner in which a probe is in contact with a sample.
Figure 2B:
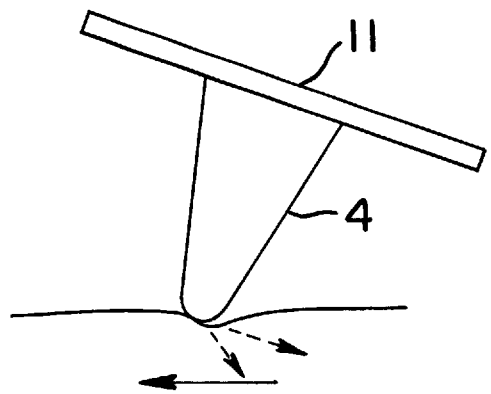

MEASUREMENT OF FRICTIONAL FORCE CURVE

Where the probe makes contact with the sample and a relative movement occurs between them in the tangential direction, the contact between the probe and the sample can take two states: in one state, the sample is not deformed and slippage at the interface dominates as shown in FIG. 2A; in the other state, the sample undergoes shearing deformation as indicated in FIG. 2B. Where the cantilever 11 is softer than the sample, the probe 4 is hardly pressed into the sample and slippage prevails. At this time, if the tangential force between the probe 4 and the sample is smaller than the maximum static frictional force, then the contact surface is kept firmly fixed and no slippage takes place. If the tangential force is greater than the maximum static frictional force, then slippage occurs. The maximum static frictional force is determined by the coagulant force between molecules forming the sample and probe.

On the other hand, where the cantilever is harder than the sample, the probe is compressed into the sample, thus producing a shearing deformation. In this case, if the tangential force varies, the magnitude of the shearing deformation changes. The shearing deformation occurs in a relatively thick layer of the sample. Therefore, the force is determined by the viscoelastic nature of the thick layer of the sample, unlike in the case of slippage. Accordingly, it can be said that shearing is more affected by the thick layer of the sample than slippage. Generally, no method of judging which of them prevails in actual frictions has been developed.

However, slippage differs from shearing deformation in form of motion. Therefore, when the sample is vibrated transversely, the phase of the torsional vibration of the cantilever varies, i.e., the degree of delay of the response of the cantilever with respect to the vibration of the sample varies. In view of this point, the phase of the torsional vibration of the cantilever is measured in the present invention.

Figure 3:
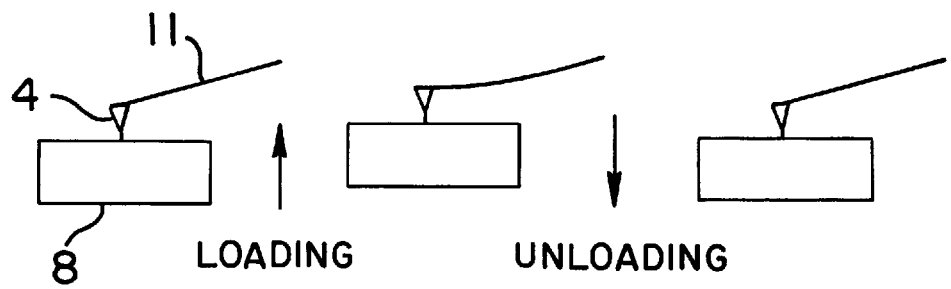
FIG. 3 is a view illustrating the state in which frictional curves are measured.

The procedure for measurements is as follows. The sample stage is moved upward as shown in FIG. 3 while measuring the amplitude and the phase of the torsional vibration of the cantilever and measuring the amplitude and the phase of the frictional force from the spring constant of the cantilever. During this process, a vertical load is applied between the probe and the sample. Then, the sample stage is moved downward. A measurement is made while unloading the vertical load. This is referred to as the frictional force curve.

INTERPRETATION OF FRICTIONAL FORCE CURVE

This frictional force curve is effective especially where the vibrational frequency of the sample is sufficiently low, for the following reason. Where the frequency of the vibration is sufficiently lower than the frequency (called the relaxation frequency) at which the viscoelastic deformation can follow, no phase change occurs in the viscoelastic deformation. On the other hand, where slippage occurs, a phase change occurs independent of the vibrational frequency.

Figure 4A:
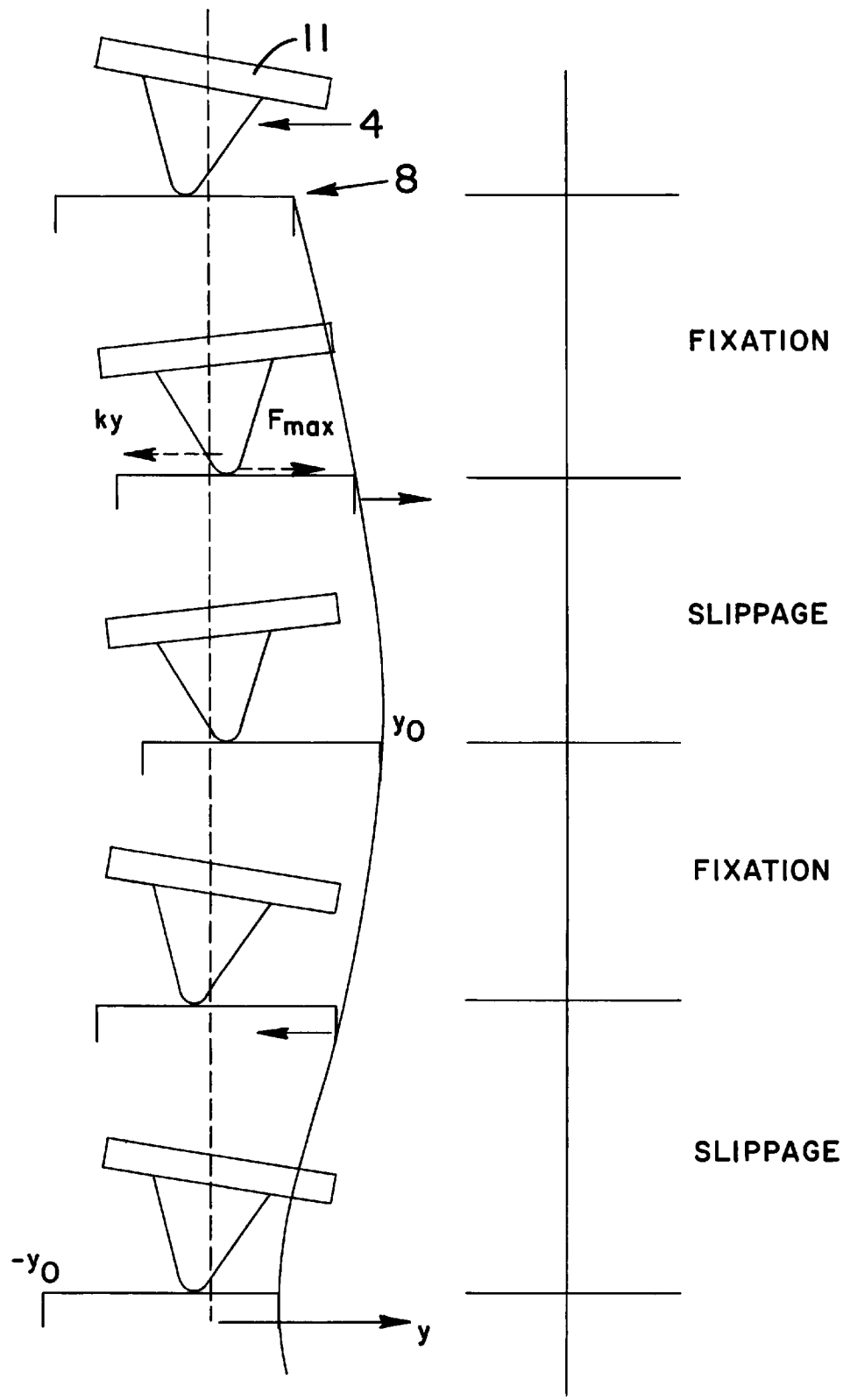
FIG. 4A and 4B are models illustrating the causes of variations in phase due to slippage.
Figure 4B:
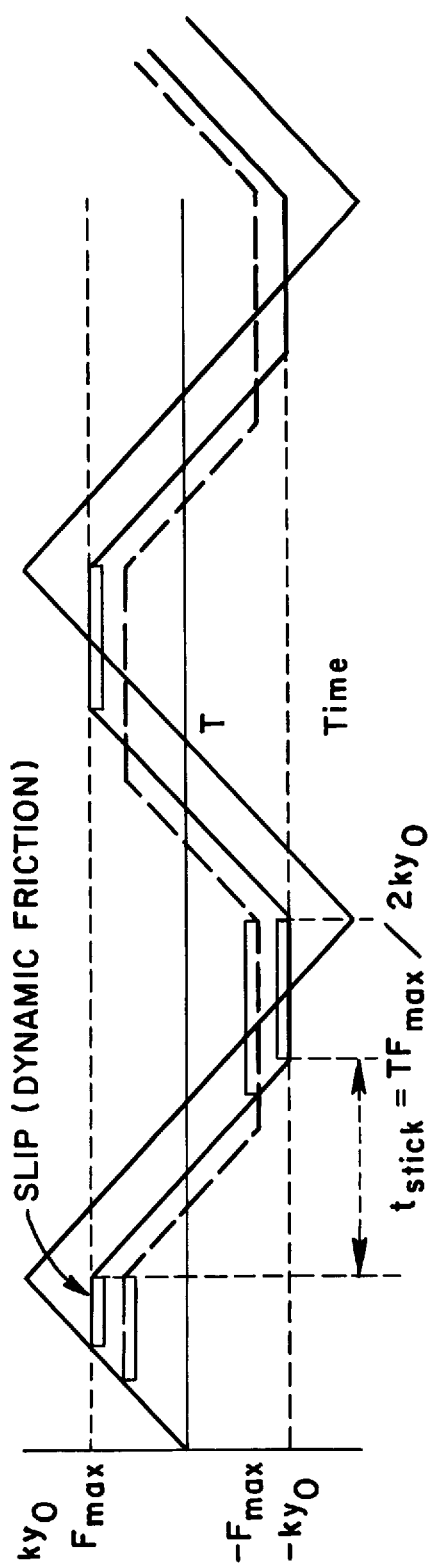

The reason why the phase is varied by slippage can be explained, using the model of FIG. 4. FIG. 4(a) shows the manner in which a sample and a probe are repeatedly slipped and firmly fixed. That is, when the sample is vibrated from −y0 to y0, torsion of the cantilever is induced by a restoring force of ky. When this restoring force of ky is less than the maximum static frictional force Fmax, the front end of the probe does not slip but moves with the sample. Namely, cantilever 11 twists until a restoring force ky against torsion become larger than the maximum static frictional force Fmax. However, if the displacement increases and the restoring force of ky of the torsion exceeds the maximum static frictional force Fmax, then the probe begins to slip. Since the dynamic frictional force is smaller than the maximum static frictional force, the probe slips until it reaches the maximum amplitude y0 and the sense of the movement is inverted. The torsion does not change during slippage. Then, the probe is again firmly fixed. The probe is moved with the sample until the restoring force of ky of the torsion in the reverse direction exceeds the maximum static frictional force Fmax. Thereafter, the probe slips until the sample reaches −y0. Variations of the torsional force of the cantilever which are caused during this interval are shown in FIG. 4(b), where the thick solid line and the broken line show the cases in which the maximum static frictional force is large and small, respectively. Comparison of the case indicated by the solid line with the case indicated by the broken line reveals that when the maximum static frictional force Fmax is small, the slippage is started earlier. As a result, the phase of variations of the torsional force is advanced. Conversely, when the phase of variations of the torsional force does not vary, it is estimated that no slippage occurs. The dynamic frictional force exerted during slippage is generally smaller than the static frictional force. Namely, when slippage ratio $(T-t_{stick})/T$ increases, the phase is advanced, and when the phase is delayed, the slippage ratio decreases.

(EXPERIMENTAL EXAMPLES)

Measurements of Hard Samples

Figure 5:
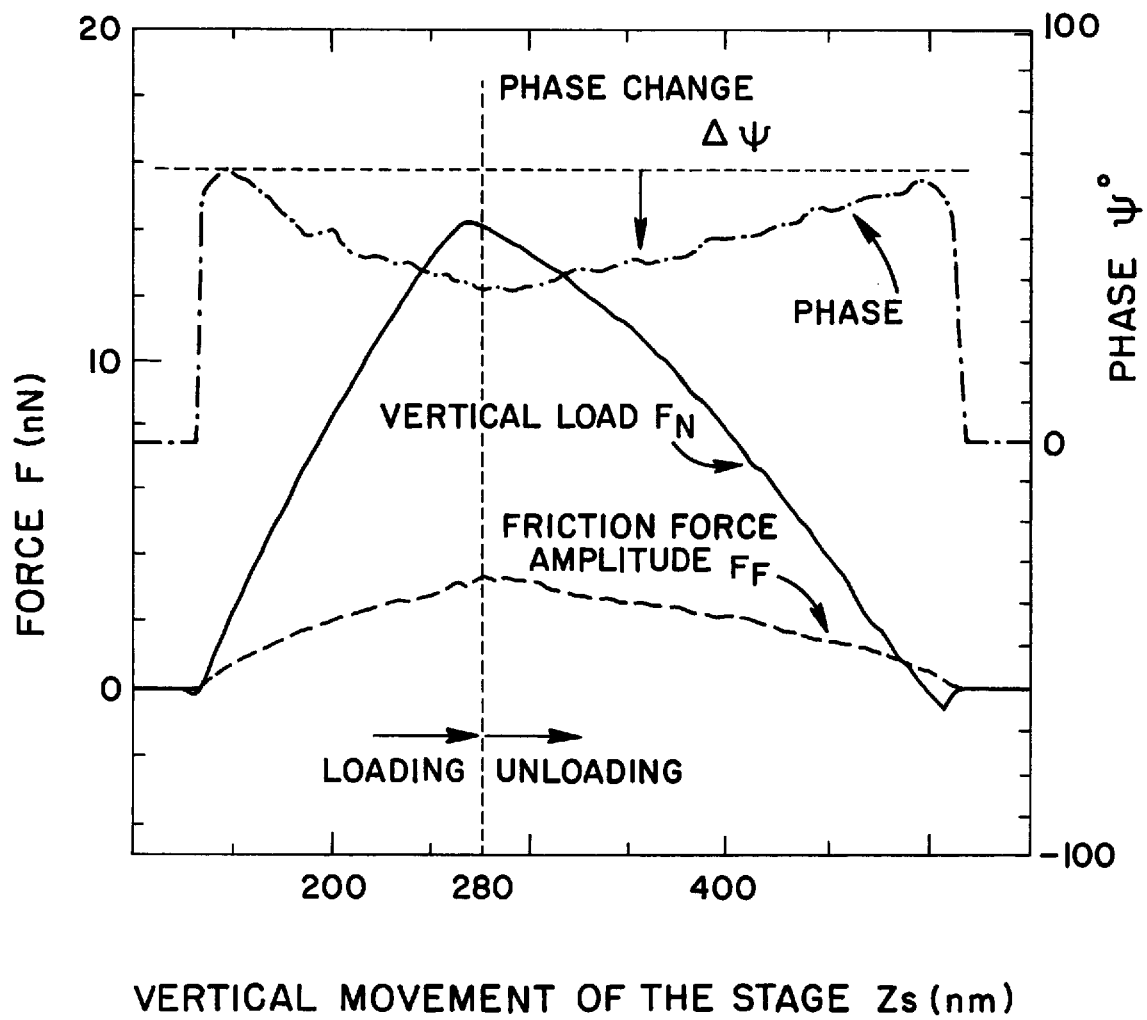
FIG. 5 is a graph showing frictional force curves of Si in water.

FIG. 5 is a frictional force curve of silicon measured in water, using a soft cantilever having a spring constant of 0.09 N/m. The frequency of the vibration was 1 kHz. The amplitude was 2 to 3 nm. The solid line indicates the vertical load $F_N$. The broken line indicates the amplitude of the frictional force $F_f$. The dotted line indicates the phase 4 of the frictional force. The horizontal axis indicates the distance that a sample stage moved vertically. The left side of Zs=280 nm indicates values measured under a loading condition. The right side indicates values measured under an unloading condition. The amplitude of the frictional force increased substantially in proportion to the vertical load. This shows that the coefficient of friction which is the ratio of the frictional force to the vertical load is maintained constant irrespective of the vertical load. When the vertical load increased, the phase was delayed. The amount of change was substantially in proportion to the vertical load in the same way as the amplitude. The fact that the amplitude and the phase vary analogously can be explained away by the model of FIG. 4. We can estimate that friction of this sample is caused by slippage.

Measurement of Soft Samples

Figure 6:
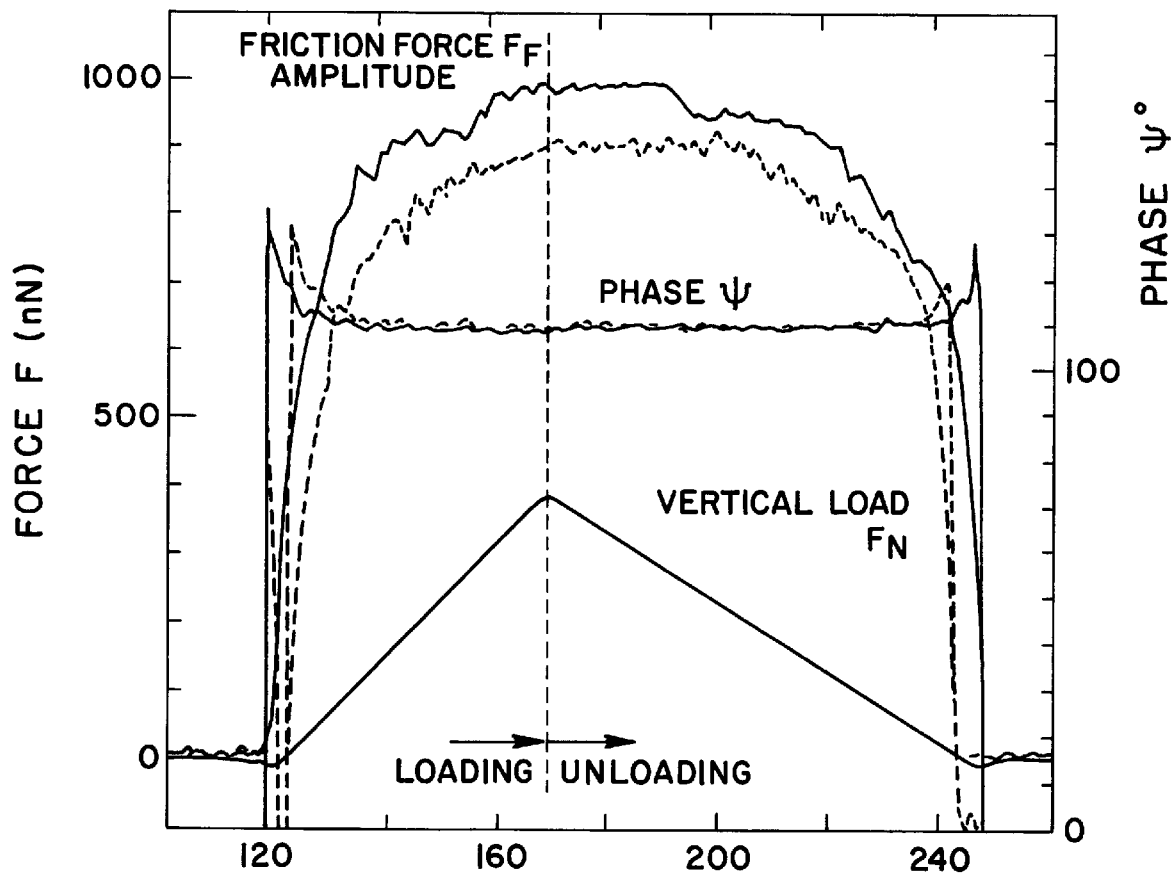
FIG. 6 is a graph showing frictional force curves of a magnetic tape.

FIG. 6 is a frictional force curve obtained from a magnetic tape. The measurement was made in air, using a hard cantilever having a spring constant of 3.2 N/m. The magnetic tape includes a bonding agent and a lubricant of relatively soft high polymer molecules, along with magnetic particles of a hard ferrite.

In the figure, the solid line and the broken line indicate results of measurements made in locations where the amplitude of the frictional force is large and small, respectively. In the case of this sample, when the vertical load increased, the amplitude of the frictional force increased but no proportional relationship existed, unlike in the case of silicon shown in FIG. 5. When the vertical load increased, the force tended to be saturated. Accordingly, the friction coefficient was not constant but decreased with increasing the vertical load. The phase rapidly decreased at first but was soon saturated. Then, the phase was kept constant although the amplitude was changing. Under this condition, the frictional force showed the same phase at two locations where the frictional force showed different amplitudes.

Generally, a frictional force varies, depending on the vertical load. When the vertical load increases, the maximum static frictional force increases. At this time, if it is assumed that slippage as shown in FIG. 4 occurs, then the phase of the frictional force should vary. Accordingly, we can consider that in the data of FIG. 6, when the phase of the frictional force is no longer varied by the vertical load, neither the probe nor the sample slips but a shearing deformation of the sample takes place. In the case of this sample, the amplitude of the frictional force differs from location to location. This suggests that the amount of shearing deformation is different. Since it is considered that the ferrite particles are hard and do not undergo shearing deformation, the shearing deformation occurs at the location of the bonding agent or the lubricant. Therefore, we estimate that the differences in frictional force are due to differences in concentration of bonding agent or lubricant. In this way, useful knowledge of the frictional characteristics of the sample can be obtained by measurement of the frictional force curve. This demonstrates the usefulness of the invention.

ESTIMATION OF MECHANISM BY WHICH FRICTIONAL FORCE IS GENERATED

Monolayer or smaller unevenness, viscoelasticity of atoms and molecules adsorbed on the surface, and other phenomena are associated with causes of frictions. In analyzing such diverse friction phenomena, analysis of the causes of frictional forces is an important clue. The novel method using a frictional force curve gives a clue to the causes of frictional forces, as described in the experimental examples. This feature is useful for evaluation of magnetic recording instruments, frictional characteristics of a lubricant on a medium, and the like, for detection of contamination of the surface, investigation of the causes, for countermeasures against poor lubrication, and for discussion of the poor lubrication. As a result, the present invention is useful for improvement of the reliability of accurate instruments and for energy saving accomplished by decreases in frictional energy loss.

As can be understood from the above description, according to the present invention, frictional forces in frictions occurring under various conditions can be systematically measured. In order to investigate the causes of the frictional forces, transverse vibrations are applied to a sample, thus inducing a torsional vibration on the cantilever. Information about the phase of the torsional vibration is used, as well as the amplitude. Especially, a friction analysis method of estimating the causes of frictional forces such as slippage and shearing deformation from variations in phase of the torsional vibration when the vertical load between the sample and the probe is varied can be obtained. Also, an atomic force microscope used for this method can be derived.

What is claimed is:

1. An atomic force microscope comprising:

a sample stage;

a vibrating device for imparting transverse vibrations to the sample stage;

a probe for contacting a sample mounted on the sample stage;

a vertical load-adjusting device for adjusting a vertical load between the sample and the probe;

first measuring means for simultaneously measuring the phase and amplitude of the torsional vibration of the probe resulting from the transverse vibration imparted to the sample stage; and second measuring means for measuring a dependence of the phase and amplitude measured by the first measuring means on a vertical load adjusted between the probe and the sample by the vertical load-adjusting device.

2. An atomic force microscope as claimed in claim 1; wherein the vertical load-adjusting device comprises means for adjusting the proximity of the probe to the sample to adjust the vertical load.

3. A method of analyzing friction forces in an atomic force microscope having a sample stage, a probe for contacting a sample mounted on the sample stage, and a cantilever supporting the probe at its tip, comprising the steps of:

vibrating the sample stage transversely;

simultaneously measuring the phase and amplitude of torsional vibrations of the cantilever excited by the transverse vibrations of the sample stage; and measuring a dependence of the measured phase and amplitude values on a vertical load adjusted between the sample and the probe to thereby analyze friction forces between the sample and the probe.

4. A method of analyzing frictions in an atomic force microscope as set forth in claim 3; wherein the vertical load between the sample and the probe is adjusted by adjusting the proximity of the probe to the sample.

5. An atomic force microscope comprising:

a sample stage for supporting a sample;

vibrating means for imparting vibrations to the sample;

a probe for contacting the sample supported on the sample stage;

a cantilever supporting the probe at a free end of the cantilever;

means for adjusting a vertical load between the probe and the sample;

means for measuring the phase and amplitude of torsional vibrations of the probe induced by the vibration imparted to the sample stage; and means for producing data indicative of the measured phase and amplitude of the torsional vibrations of the probe as a function of the adjusted vertical load between the probe and the sample for analyzing friction forces produced between the sample and the probe.

6. An atomic force microscope as claimed in claim 5; further comprising a laser beam generating means for directing a laser beam onto the cantilever, a photodetector for receiving laser beam light reflected from the cantilever, and a control circuit for receiving an output signal from the photodetector and outputting a control signal to the vibrating means to control vibration of the sample stage.

7. An atomic force microscope as claimed in claim 5; wherein the means for adjusting a vertical load between the probe and the sample includes means for varying the distance between the probe and the sample.

8. An atomic force microscope as claimed in claim 5; wherein the means for adjusting a load between the probe and the sample includes means for adjusting the proximity of the probe to the sample.

9. A method of analyzing friction forces in an atomic force microscope having a sample stage, a probe for contacting a sample mounted on the sample stage, and a cantilever supporting the probe at a free end of the cantilever, comprising the steps of:

imparting vibrations to the sample;

measuring the phase and amplitude of torsional vibrations of the cantilever induced by the vibrations imparted to the sample while adjusting a vertical load between the probe and the sample; and producing data indicative of the measured phase and amplitude of the torsional vibrations of the probe as a function of the adjusted vertical load between the probe and the sample to thereby analyze friction forces produced between the sample and the probe.

10. A method as claimed in claim 9; wherein the adjusting step includes varying the distance between the probe and the sample.

11. A method as claimed in claim 9; wherein the adjusting step includes adjusting the proximity of the probe to the sample.

12. A method as claimed in claim 9; wherein the measuring step includes simultaneously measuring the phase and amplitude of deflecting vibrations of the cantilever.

\* \* \* \* \*